(12) United States Patent
Hofherr et al.

(10) Patent No.: US 10,892,537 B2
(45) Date of Patent: Jan. 12, 2021

(54) WAVEGUIDE-COUPLING DEVICE AND POSITION SENSOR DEVICE FOR A HYDRAULIC CYLINDER, HYDRAULIC CYLINDER AND METHOD FOR OPERATING A WAVEGUIDE-COUPLING DEVICE

(71) Applicant: Balluff GmbH, Neuhausen a.d.F. (DE)

(72) Inventors: Matthias Hofherr, Stuttgart (DE); Stephan Bleil, Aichtal (DE)

(73) Assignee: BALLUFF GMBH, Neuhausen (DE)

( * ) Notice: Subject to any disclaimer, the term of this patent is extended or adjusted under 35 U.S.C. 154(b) by 337 days.

(21) Appl. No.: 16/093,292

(22) PCT Filed: Feb. 15, 2017

(86) PCT No.: PCT/DE2017/100113
§ 371 (c)(1),
(2) Date: Oct. 12, 2018

(87) PCT Pub. No.: WO2017/178001
PCT Pub. Date: Oct. 19, 2017

(65) Prior Publication Data
US 2019/0207285 A1    Jul. 4, 2019

(30) Foreign Application Priority Data
Apr. 12, 2016    (DE) .................. 10 2016 106 747

(51) Int. Cl.
*H01P 5/08*        (2006.01)
*H01P 5/103*      (2006.01)
(Continued)

(52) U.S. Cl.
CPC ............. *H01P 5/08* (2013.01); *E02F 9/2271* (2013.01); *E02F 9/26* (2013.01); *F15B 15/14* (2013.01);
(Continued)

(58) Field of Classification Search
CPC .... H01P 5/08; H01P 5/103; H01P 1/00; H01P 3/06; H01P 3/12; E02F 9/2271;
(Continued)

(56) References Cited

U.S. PATENT DOCUMENTS 2,892,982 A * 6/1959 Allen ....................... H01P 5/16
                                                                333/117
4,519,662 A    5/1985 Riley
(Continued)

OTHER PUBLICATIONS

Translation of International Preliminary Report on Patentability for PCT/DE2017/100113; dated Oct. 25, 2018; 14 Pages.

*Primary Examiner* — Matthew M Barker
(74) *Attorney, Agent, or Firm* — Taft Stettinius & Hollister LLP; Ryan O. White; Derek B. Lavender

(57) ABSTRACT

A waveguide-coupling device (14) for a hydraulic cylinder (10) has an outer conductor element (22) to which a microwave signal can be supplied, an inner conductor element (24) for coupling a waveguide mode into a liquid-filled inner chamber (16) of the hydraulic cylinder (10) and a dielectric insulating element (22) arranged between the inner conductor element (24) and the outer conductor element (20), wherein the inner conductor element (24) and the dielectric insulating element (22) as well as the dielectric insulating element (22) and the outer conducting element (20) are each connected to each other in a liquid-tight manner.

10 Claims, 4 Drawing Sheets

(51) Int. Cl.
| | |
|---|---|
| *F15B 15/28* | (2006.01) |
| *H01Q 13/08* | (2006.01) |
| *E02F 9/22* | (2006.01) |
| *E02F 9/26* | (2006.01) |
| *F15B 15/14* | (2006.01) |
| *H01P 1/00* | (2006.01) |
| *H01P 3/06* | (2006.01) |
| *H01P 3/12* | (2006.01) |
| *G01S 13/88* | (2006.01) |
| *H01Q 9/30* | (2006.01) |
| *G01S 7/03* | (2006.01) |

(52) U.S. Cl.
CPC ............ *F15B 15/2869* (2013.01); *H01P 1/00* (2013.01); *H01P 3/06* (2013.01); *H01P 3/12* (2013.01); *H01P 5/103* (2013.01); *H01Q 13/08* (2013.01); *G01S 7/032* (2013.01); *G01S 13/88* (2013.01); *H01Q 9/30* (2013.01)

(58) Field of Classification Search
CPC ........ E02F 9/26; F15B 15/14; F15B 15/2869; G01S 7/032; G01S 13/88; G01F 23/284; H01Q 1/225; H01Q 9/30; H01Q 13/08
See application file for complete search history.

(56) References Cited

U.S. PATENT DOCUMENTS

| | | | |
|---|---|---|---|
| 5,595,502 A | | 1/1997 | Allison |
| 6,062,095 A | * | 5/2000 | Mulrooney ............ G01D 11/24 73/204.22 |
| 6,178,817 B1 | * | 1/2001 | Hewelt ................ G01F 23/284 324/637 |
| 7,433,573 B2 | | 10/2008 | Trummer |
| 7,492,165 B2 | | 2/2009 | Maier et al. |
| 9,476,753 B2 | | 10/2016 | Georgescu et al. |
| 2008/0134778 A1 | * | 6/2008 | Osswald ............... G01F 23/284 73/304 C |

\* cited by examiner

WAVEGUIDE-COUPLING DEVICE AND POSITION SENSOR DEVICE FOR A HYDRAULIC CYLINDER, HYDRAULIC CYLINDER AND METHOD FOR OPERATING A WAVEGUIDE-COUPLING DEVICE

This application is a U.S. national stage application under 35 U.S.C. § 371 of PCT International Application Serial No. PCT/DE2017/100113, filed Feb. 15, 2017, and which in turns claims priority to German Patent Application No. 10 2016 106 747.4, filed Apr. 12, 2016, the disclosures of which are hereby expressly incorporated by reference herein in their entireties.

The invention relates to a waveguide-coupling device as well as a position sensor device for a hydraulic cylinder, a hydraulic cylinder as well as a method for operating a waveguide-coupling device.

PRIOR ART

It is known from practice that waveguide-coupling devices are suitable for coupling, for example, microwave signals into a hollow waveguide by transferring the microwave signals into a waveguide mode and coupling them into an inner chamber of the waveguide. The waveguide mode which is generated can serve, for example, for measuring the filling level of liquids received in the hollow waveguide by a time shift and/or phase shift between the waveguide mode coupled into the inner chamber and the waveguide mode reflected on the liquid being evaluated. Here, a sealing element which is arranged at a distance from the waveguide-coupling device in the hollow waveguide seals the waveguide-coupling device against the liquid, among other things. Such a sealing element can change the coupling characteristic of the waveguide.

It is likewise known from practice that hydraulic cylinders are used, for example, in mobile hydraulic applications, i.e. in hydraulic cylinders which are integrated into mobile working machines or are used in large hydraulic applications, such as, for example, for hydraulic cylinders for deep-sea research. In such applications, hydraulic oil is located within the hydraulic cylinder, said hydraulic oil being compressed by means of a piston guided in the cylinder. Thus, for example, high pressures between 0 and 450 bar can occur, and a pressure change within the cylinder can take place particularly quickly, i.e. with a high dynamic range.

Regulation of the piston movement of a piston which moves axially in the hydraulic cylinder can be carried out by means of a position sensor. Such a position sensor can, for example, be formed on the basis of a magnetostrictive waveguide and is, for example, known by the name of "Temposonics®" by the company MTS Sensor Technologie GmbH & Co. KG.

An object of the invention is to provide measures in order to provide an especially simple and accurate position detection for hydraulic cylinders based on a hollow waveguide principle.

DISCLOSURE OF THE INVENTION

According to a first aspect, a waveguide-coupling device for a hydraulic cylinder is provided which has an outer conductor element to which a microwave signal can be supplied, an inner conductor element for coupling a waveguide mode into a liquid-filled inner chamber of the hydraulic cylinder, and a dielectric insulating element arranged between the inner conductor element and the outer conductor element, wherein the inner conductor element and the dielectric insulating element as well as the dielectric insulating element and the outer conductor element are respectively connected to each other in a liquid-tight manner.

According to the invention, the waveguide-coupling device can be arranged in their installation situation in a hydraulic cylinder filled by means of a liquid, in particular (hydraulic) oil, such that a microwave signal can be supplied to the outer conductor element of the waveguide-coupling device and a waveguide mode, in particular a transverse magnetic mode in the form, for example, of a TM01 mode, can be generated in an inner chamber of the hydraulic cylinder. This waveguide mode can be generated from a transverse electromagnetic waveguide mode propagating in the inner conductor element, in particular a TEM mode, during a transfer of the inner conductor element into the inner chamber of the hydraulic chamber. Here, the liquid received in the inner chamber of the hydraulic cylinder, for example the oil, can serve as a further dielectric medium in the hydraulic cylinder, such that a further waveguide structure can be formed by the inner conductor element, the liquid and the hydraulic cylinder. Overall, the waveguide-coupling device can serve for impedance matching between an electronic feed line, in particular a coaxial cable or a platinum conductor guided in a planar manner, for the microwave signal and an impedance of the hollow waveguide formed by the hydraulic cylinder Two adjacent parts, namely the inner conductor element and the dielectric insulating element, can be respectively connected to each other in a liquid-tight manner. The waveguide-coupling device can thus integrate a liquid-tight sealing in an especially simple manner and can simultaneously be formed in a space-saving manner. Here, the liquid-tight sealing can effect a small electrical change in the waveguide-coupling device, especially in comparison to a separate sealing element arranged in the hollow waveguide, such that a coupling characteristic of the waveguide-coupling device can remain substantially unchanged. The waveguide-coupling device can further be inserted directly into the hydraulic cylinder without an additional sealing element. An axial position detection of a piston in the hydraulic cylinder can thus be especially accurate.

In an embodiment, the inner conductor element can be formed as a solid cylinder widening in a stepped manner, the dielectric element can be formed substantially as a hollow cylinder widening in a stepped manner and the outer conductor element can be formed substantially as a hollow cylinder. Dimensions of these parts, in particular their radii and/or axial lengths, can influence a line impedance of the individual parts and thus enable impedance matching of the waveguide-coupling device. Due to the variety of possible dimensions of the parts involved, in particular with approximately equal target impedance of the waveguide-coupling device, various designs of the waveguide-coupling device can be achieved, such that the waveguide-coupling device can be versatile.

For example, the dielectric insulating element can surround the inner conductor element in such a manner that only an end region of the widened inner conductor element can project out of the dielectric insulating element and form a waveguide structure with the liquid and the hydraulic cylinder. The stepped widening of the dielectric insulating element is provided in the region of the portion of the inner conductor element which has the smaller radius. The outer conductor element can surround the dielectric insulating element in such a manner that an end region of the dielectric insulating element which is widened in a stepped manner projects out of the outer conductor element. An end region of the outer conductor element which is arranged opposite the widened end region of the inner conductor element can have a recess on the front side whose edges can be rounded in the base region. Overall, the waveguide-coupling device can have a compact structure which can be achieved geometrically very easily. These measures can accomplish a design of the waveguide-coupling device which is mechanically very stable, because the dielectric insulating element and the inner conductor element or outer conductor element can always rest on a sufficiently large step in order to thus be able to withstand the pressure which can act on the entire waveguide-coupling device.

The waveguide-coupling device can be formed rotationally symmetrically and/or coaxially, seen along its longitudinal axis, such that the coupling characteristic of the waveguide-coupling device remains substantially unchanged during rotation about its longitudinal axis. The hydraulic cylinder can be formed rotationally symmetrically.

The inner conductor element can be formed of metal, in particular brass, and/or the outer conductor element can be manufactured from metal, in particular X8CrNiS18-9 or X2CrNiMo17-12-2. A material of the dielectric insulating element can have, for example, an oil-resistant solid.

In an embodiment, for liquid-tight connection, an element of the inner conductor element and the dielectric insulating element can have an at least partially peripheral recess, in particular a groove or a furrow, and an adjacently arranged further element of the inner conductor element and the dielectric insulating element can have an at least partially peripheral protrusion which positively engage each other. Alternatively or additionally, for liquid-tight connection, an element of the dielectric insulating element and the outer conductor element can have an at least partially peripheral recess, in particular a groove or a furrow, and an adjacently arranged further element of the dielectric insulating element and the outer conductor element can have an at least partially peripheral protrusion which positively engage each other. In particular, the material of the element or the further element can engage one another or be interlocked such that an especially simple liquid sealing of the waveguide-coupling device can be guaranteed. The recess and the protrusion can be formed to be fully peripheral and/or can extend perpendicularly to the longitudinal axis of the waveguide-coupling device. The geometric protrusion or toothing of the barrier materials can likewise be considered as a slight deviation of the impedance, but without changing the intrinsic properties of the dielectric insulating element, such that an impedance characteristic and a coupling characteristic of the waveguide-coupling device does not change fundamentally or substantially.

In an embodiment, an element of the inner conductor element and the dielectric insulating element can have an at least partially peripheral recess, in particular running perpendicular to the longitudinal direction of the waveguide-coupling device, in particular a groove or a furrow in which an at least partially peripheral sealing element is received, and an adjacently arranged further element of the inner conductor element and the dielectric insulating element can bear flush against the element. Alternatively or additionally, for liquid-tight connection, an element of the dielectric insulating element and the outer conductor element can have an at least partially peripheral recess, in particular running perpendicularly to the longitudinal direction of the waveguide-coupling device, in particular a groove or a furrow, in which an at least partially peripheral sealing element is received, and an adjacently arranged further element of the dielectric insulating element and the outer conductor element can bear flush against the element. In particular, in both embodiment options, the recess and the sealing element can be formed to be fully peripheral. The sealing element can thus be used to cause an impedance matching of the waveguide-coupling device in order to enable a desired coupling of the hollow waveguide into the liquid-filled inner chamber.

In an embodiment, the sealing element can be formed as a two-component injection-moulded part which can be injected during a production process of the waveguide-coupling device in the receptacle by means of injection-moulding technology. A material of the injection-moulded part can be, for example, rubber or Teflon. This type of sealing can effect a local impedance matching of the waveguide-coupling device.

In an embodiment, an at least partially peripheral support element can further be received in the recess, said support element being able to be arranged adjacently to the sealing element. A defined location of the sealing element in the recess can thus be guaranteed, such that the liquid-tight connection between the respective parts is improved. The support element can also be formed to be fully peripheral and/or can extend perpendicularly to the longitudinal direction of the waveguide-coupling device.

In an embodiment, the sealing element can be formed as an O-ring and the support element as a slotted support ring, in particular made of a dielectric material such as, for example, rubber or Teflon. This type of sealing can effect a local impedance deviation of the waveguide-coupling device. For example, the sealing element and the support element which can be received in the dielectric insulating element and can bear against an inner surface of the outer conductor element cause a locally limited change in the dielectric material of the dielectric insulating element, which can be considered as a capacitive change in the impendence properties of the waveguide-coupling device. The sealing element and the support element can, for example, be received in the inner conductor element and seal against an inner surface of the dielectric insulating element. Replacing metal with the sealing element and support element which can be received in the recess of the inner conductor element can increase the inductive properties because the inner conductor element becomes "thinner" due to the recess. In particular, a targeted change in the impedance properties and thus the coupling characteristic of the waveguide-coupling device can be effected.

In an embodiment, the inner conductor element and the dielectric insulating element can be connected to each other by means of a thread which is in particular arranged along a longitudinal axis of the waveguide-coupling device. Alternatively or additionally, the dielectric insulating element and the outer conductor element can be connected to one another at least partially by means of a thread which is in particular arranged along a longitudinal axis of the waveguide-coupling device. The one or the two threads can effect a location-stable positioning of the parts of the waveguide-coupling device and a flush contact of adjacent parts for liquid sealing. The waveguide-coupling device can further be shortened or lengthened depending on hydraulic cylinder dimensions, such that the same construction of the waveguide-coupling device can be used in various hydraulic cylinders. Dynamic pressure changes which are caused due to the compression of the liquid in the hydraulic cylinder by the piston can likewise be equalised by a low axial displacement of the parts, mediated by the thread.

The radially inner thread which is provided on the inner conductor element and on the dielectric insulating element and the radially outer thread which is provided on the dielectric insulating element and on the outer conductor element can have different thread depths. For example, the radially inner thread can have a lesser thread depth than the radially outer thread. Due to a small ratio of the thread depth of the radially inner thread, viewed over an axial length of the waveguide-coupling device, and a wavelength of the waveguide mode, the inner thread can be viewed as a surface having an elevated surface roughness and can effect a negligible impedance change of the waveguide-coupling device. The coarser radially outer thread is closer to the wavelength of the microwave signals in its thread depth, viewed over the axial length of the waveguide-coupling device, and can thus lead to a small electrical shift in the impedance properties of the waveguide-coupling device. This type of thread choice can support an axial length change of the waveguide-coupling device.

Overall, the above-mentioned liquid-tight sealing as well as the thread can be fully integrated into the waveguide-coupling device as electrical components. Their dielectric properties can be components of the transformation characteristic of the waveguide-coupling device for the, in particular complex, transformation between the microwave signals and the waveguide mode. The above-mentioned liquid-tight sealing as well as the thread can further be temperature resistant and/or can withstand high, in particular dynamically occurring, pressure fluctuations, for example in a range of approx. 0 bar to 450 bar, in the hydraulic cylinder. In particular, the waveguide-coupling device can be resistant to pressure-caused strain and rupturing.

It is understood that desired impedance characteristics of the waveguide-coupling device can be determined, for example, by means of simulations and can be achieved in a targeted manner by a suitable modification of the geometric design parameters of the parts of the waveguide-coupling device. In particular, deviations which are based on the liquid-tight connection of the individual parts as well as the thread are compensated by a suitable modification of the geometric design parameters of the other parts.

The waveguide-coupling device can further be connected to one or more circuit boards, or have these circuit boards, which can be electrically connected to the inner conductor element. Here, the circuit board or circuit boards can be arranged in the recess of the outer conductor element.

According to a second aspect, a hydraulic cylinder, in particular a mobile hydraulic cylinder or a large hydraulic cylinder, having a waveguide-coupling device according to the first aspect, is provided.

According to a third aspect, a position sensor device for a hydraulic cylinder is provided, which has a waveguide-coupling device according to the first aspect and an electronic evaluation unit for determining a position of a piston of the hydraulic cylinder using a time difference and/or phase difference of a waveguide mode coupled by the inner conductor element into a liquid-filled inner chamber of the hydraulic cylinder and a waveguide mode reflected on the piston and detected by the inner conductor element. Here, the waveguide mode guided in the inner conductor element can be a TEM mode and thus can be different from the waveguide mode formed in the inner chamber of the hydraulic cylinder, in particular the TM01 mode.

According to a fourth aspect, a method for operating a waveguide-coupling device for a hydraulic cylinder according to the first aspect or a position sensor device for a hydraulic cylinder according to the third aspect is provided, wherein a microwave signal is supplied to the outer conductor element, which is converted into a waveguide mode by means of the waveguide element and is coupled into a liquid-filled inner chamber of the hydraulic cylinder via the inner conductor element, the waveguide-coupling device being received in said inner chamber. In the method, an evaluation of the position of the piston of the hydraulic cylinder can optionally take place as described above, using the time difference and/or phase difference of the waveguide mode coupled by the inner conductor element and the waveguide mode reflected on the piston.

BRIEF DESCRIPTION OF THE DRAWINGS

Exemplary embodiments of the invention are depicted in the drawings and are described in more detail in the following description. Here are shown.

EMBODIMENTS OF THE INVENTION

Figure 1:
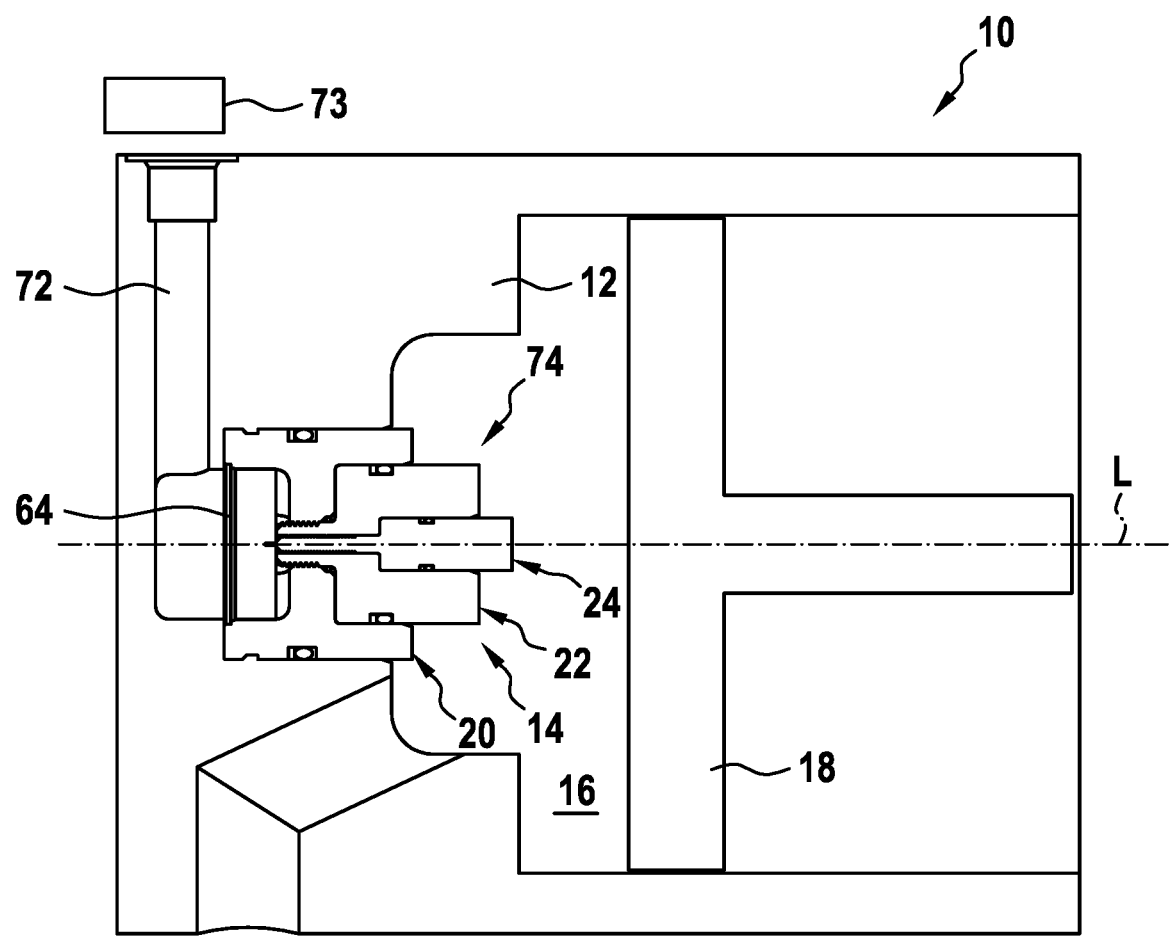
FIG. 1 a schematic sectional view of a waveguide-coupling device according to a first exemplary embodiment in a state installed in a hydraulic cylinder.

A hydraulic cylinder 10 has a metal hollow cylinder 12 in which a waveguide-coupling device 14 is fully received. The compactly formed waveguide-coupling device 14 projects into an oil-filled inner chamber 16 of the hydraulic cylinder 10 which can be enlarged or made smaller by means of a piston 18 of the hydraulic cylinder 10, said piston being guided along a longitudinal axis L of the hydraulic cylinder 10. A longitudinal axis L of the coaxially formed waveguide-coupling device 14 corresponds to the longitudinal axis L of the hydraulic cylinder 10 which is likewise formed rotationally symmetrically.

The waveguide-coupling device 14 has a metal outer conductor element 20, a dielectric insulating element 22 made from an oil-resistant solid material as well as an inner conductor element 24 made of brass. The inner conductor element 24 is formed as a brass solid cylinder whose radius is enlarged in a stepped manner. Here, a longitudinal axis of the inner conductor element 24 corresponds to the longitudinal axis L of the hydraulic cylinder 10. A first portion 26 of the inner conductor element 24 which is arranged on a side of the inner conductor element 26 facing away from the inner chamber 16 has a smaller radius than a second portion 28 of the inner conductor element 24 which is arranged adjacently to the inner chamber 16. A longitudinal extension of the portion 26 is slightly shorter than a longitudinal extension of the portion 28. A protruding soldering tip 29 is formed in a front face of the first portion 26 of the inner conductor element 24, said end face pointing away from the inner chamber 16. The dielectric insulating element 22 forms a hollow cylindrical casing of the inner conductor element 24. Here, a longitudinal axis of the dielectric insulating element 22 corresponds to the longitudinal axis L of the hydraulic cylinder 10. An outer radius of the dielectric insulating element 22 is enlarged in a stepped manner, seen along the longitudinal axis L, in the direction of the inner chamber 16. A first portion 30 of the dielectric insulating element 22 has a smaller outer radius than a second portion 32 of the dielectric insulating element 22. The first portion 30 of the dielectric insulating element 22 surrounds the first portion 26 of the inner conductor element 24 fully up to the soldering tip 29 and the second portion 32 of the dielectric insulating element 22 partially surrounds the remaining first portion 26 of the inner conductor element 24 and partially surrounds the second portion 28 of the inner conductor element 24. The inner conductor element 24 protrudes out of the dielectric insulating element 22 into the inner chamber 16 of the hydraulic cylinder 10. The outer conductor element 20 is formed cylindrically. Here, a longitudinal axis of the outer conductor element 20 corresponds to the longitudinal axis L of the hydraulic cylinder 10. An end of the outer conductor element 20 facing away from the inner chamber 16 is provided with a front face side annular recess 34, whose end portion has a rounded contour 36 in a base region of the recess 34. A base surface of the recess 34 is provided with a round through opening 37, through which the end regions of the first portion 26 of the inner conductor element 24 and the first portion 30 of the dielectric insulating element 22 pass.

The rounded contour 36 of the recess 34 can optionally also have a shape which tapers in the direction of the inner chamber 16 of the hydraulic cylinder 10 (not shown), in which a radius of curvature of the contour 36 changes suddenly and a curvature repeats itself before or after the jump in radius of curvature.

In order to seal the waveguide-coupling device 14 in a liquid-tight manner against the inner space 16 of the hydraulic cylinder 10 and simultaneously to form it to be especially pressure-resistant to pressure fluctuations in the range of 0 bar to 450 bar, adjacent surfaces of the adjoining components 20, 22, 24 of the waveguide-coupling device 14 bear flush against one another. The second portion 28 of the inner conductor element 24 and the second portion 32 of the dielectric insulating element 22 as well as the second portion 32 of the dielectric insulating element 22 and the outer conductor element 20 are further respectively connected to each other locally at a location in a liquid-tight and fully peripheral manner. For this purpose, an outer surface of the second portion 28 of the inner conductor element 24 has a fully peripheral recess 42 in the form of a groove, in which a support element 44 in the form of a slotted support ring as well as a sealing element 46 in the form of an O-ring are received. The groove 42, the support element 44 as well as the sealing element 46 extend perpendicularly to the longitudinal direction L. The support element 44 is arranged within the groove 42 on a side facing away from the inner chamber 16 and the sealing element 46 is arranged within the groove 42 on a side pointing towards the inner chamber 16. A sealing between the second portion 32 of the dielectric insulating element 22 and the outer conductor element 20 is achieved by means of a recess 48 formed in an outer surface of the second portion 32 of the dielectric insulating element 24, in which a support element 50 in the form of a slotted support ring as well as a further sealing element 52 in the form of an O-ring are arranged. The recess 48, the support ring 50 as well as the sealing element 52 extend perpendicularly to the longitudinal direction L of the hydraulic cylinder 10, and the support ring 50 is arranged on a side facing away from the inner chamber 16 and the sealing element 42 is arranged on a side pointing towards the inner chamber 16 in the recess 48. A sealing between the outer conductor element 20 and the hollow cylinder 12 is formed by a recess 54 shaped as a groove being provided in an outer surface of the outer conductor element 20, in which a support element 56 in the form of a slotted support ring and a sealing element 58 in the form of an O-ring are received. The recess 54, the support element 56 and the sealing element 58 extend perpendicularly to the longitudinal direction L. The support element 56 is arranged on a side facing away from the inner chamber 16 of the hydraulic cylinder 10 and the sealing element 59 is arranged on a side facing towards the inner chamber 16 in the recess 54.

A thread 60 is fully peripheral and, seen in the direction of the longitudinal axis L, is provided partially along an outer surface of the first portion 26 of the inner conductor element 24 and an adjacently bearing inner surface of the first portion 30 of the dielectric insulating element 22 and partially along the second portion 32 of the dielectric insulating element 22. A fully peripheral thread 62 is arranged, seen in the direction of the longitudinal axis L, partially along an outer surface of the first portion 30 of the dielectric insulating element 22 and partially along an adjacent inner surface of the outer conductor element 20. Both threads 60, 62 enable a marginally defined axial shift of the components 20, 22, 24, 44, 46, 50, 52, 56, 58 with dynamic pressures which are caused by the compression of the oil by means of the piston 18 and can act on the waveguide-coupling device 14 in the direction of the outer conductor element 20. The thread 60 has a smaller thread depth than the thread 62.

A plate-shaped flange 64 is introduced in a fully peripheral recess 66 in the form of a chamfered rounded groove in an end region of the recess 34 of the outer conductor element 20, said end region pointing away from the inner chamber 16, starting from the front face of the outer conductor element 20. A support element 68 in the form of a slotted support ring and a sealing element 70 in the form of an O-ring are introduced into the recess 66 adjacently to the flange 64 or to the recess 34 and seal the waveguide-coupling element 14 against a blind hole-shaped bore 72 in the hollow cylinder 12, said bore running radially to the longitudinal axis L.

Figure 2:
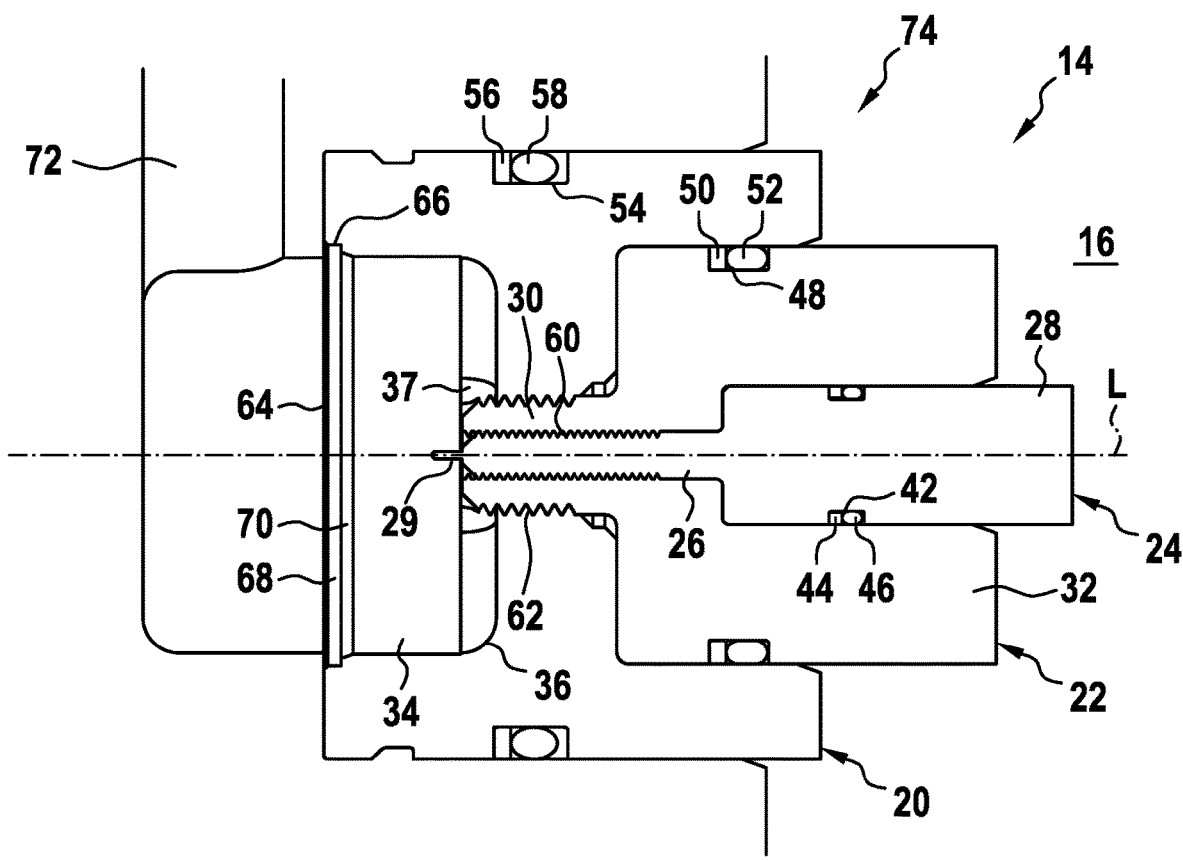
FIG. 2 an enlarged schematic sectional view of the waveguide-coupling device in FIG. 1.

A circuit board (not shown) is received in the flange 64, which is electrically connected to the soldering tip 29, for example by means of a corresponding high-frequency plug (not shown) via contact with the board, said contact being coaxial in a planar manner. In FIGS. 1, 2, the soldering tip is depicted in a shortened manner. Here, the soldering tip 29 serves as an electric pin for the board. Alternatively, the board can be arranged on the base surface of the recess 36, such that the soldering tip 29 can be soldered with the board via the planar coaxial contact.

Instead of the flange 64, the board can be arranged directly in the recess 66 and abut against the support element 86. It is also possible that several circuit boards are provided instead of one circuit board.

One or more electronic connections between the circuit board and an electronic evaluation unit 73 can be supplied via the bore 72. The circuit board has an electronic connection for a supply of a microwave signal to the outer conductor element 20 as well as an electronic connection for receiving a high frequency signal via the soldering tip from the inner conductor element 24, i.e. the planar coaxial contact described above. The evaluation unit 73, the electrical connection or connections, the board and the waveguide-coupling device 14 form a position sensor device 74 for detecting an axial position of the piston 18 within the hollow cylinder 12 of the hydraulic cylinder 10 in order to enable regulation of the functionality of the hydraulic cylinder 10. Here, the board represents an electronics system of the position sensor device 74.

In an operation of the waveguide-coupling device 14 or the position sensor device 74, microwave signals are supplied to the outer conductor element 20 via the electronic connection, converted into a TEM waveguide mode which propagates in the inner conductor element 24 and this mode is coupled into the inner chamber 16 via the inner conductor element 24 which projects into the inner chamber 16. This waveguide mode is then converted into a TM01 mode during transfer from the inner conductor element 24 into the oil-filled inner chamber 16. Here, the waveguide-coupling device 14 serves as a convertor or "transformer" for the microwave signals into the TM01 mode. The axial position of the piston 18 of the hydraulic cylinder 10 is detected by the waveguide mode reflected on the piston 18 being received again by means of the inner conductor element 24 and supplied to the evaluation unit 73 via the corresponding electronic connection. In a conventional manner, a time difference and/or phase difference between the wave coupled by the inner conductor element 24 and the wave received by the inner conductor element 24 can be used in the evaluation unit 73 for axial position detection of the piston 18. Pressure forces which can occur dynamically during axial movement of the piston 18 in the direction of the waveguide-coupling device 14 can be absorbed by the thread 60 or 62 in such a manner by the inner conductor element 24 and the dielectric insulating element 22 or the dielectric insulating element 22 and the outer conductor element 20 being able to rotate slightly relative to each other. Here, the solder connection between the soldering tip 29 and the board are stable in such a manner that it withstands such an axial shift of the inner conductor element 24.

Figure 3:
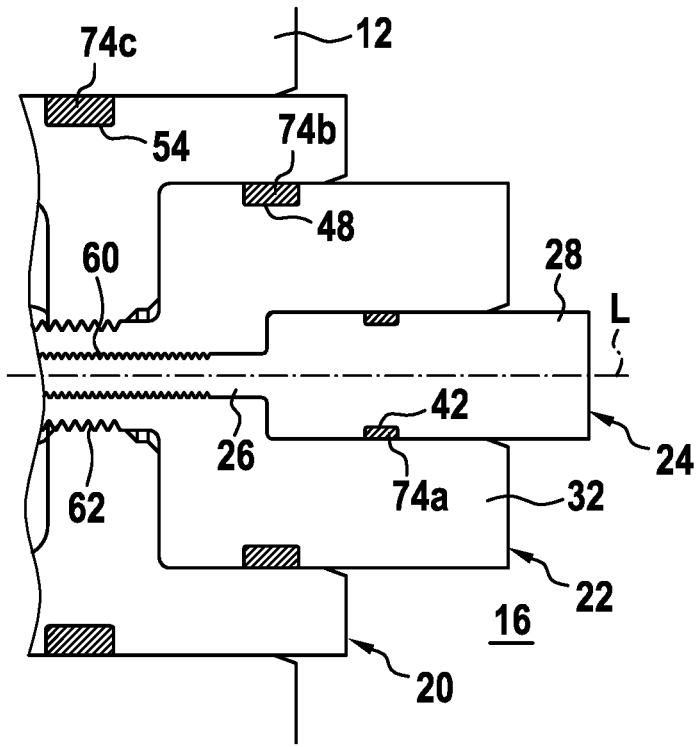
FIG. 3 a schematic sectional view of a liquid-tight sealing of two parts of a waveguide-coupling device according to a second exemplary embodiment.

The waveguide-coupling device 14 shown in FIG. 3 is formed in a similar manner to the waveguide-coupling device 14 in FIGS. 1, 2. However, a two-component injection-moulded material 74a-74c, for example shaped in a bead-like manner, is received instead of the support element 44, 50, 56, 68 and the sealing element 46, 52, 58, 70 in the recess 42, 48, 54, 66 and fills it completely, in order to seal the adjacent components 12, 20 or 20, 22 or 22, 24 or 20, 64 in a liquid-tight manner. For the sake of providing an overview, the described liquid-tight seal between the flange 64 and the outer conductor element 20 is not depicted. The operation of the waveguide-coupling device 14 is similar to the operation of the waveguide-coupling device 14 in FIGS. 1, 2.

Figure 4:
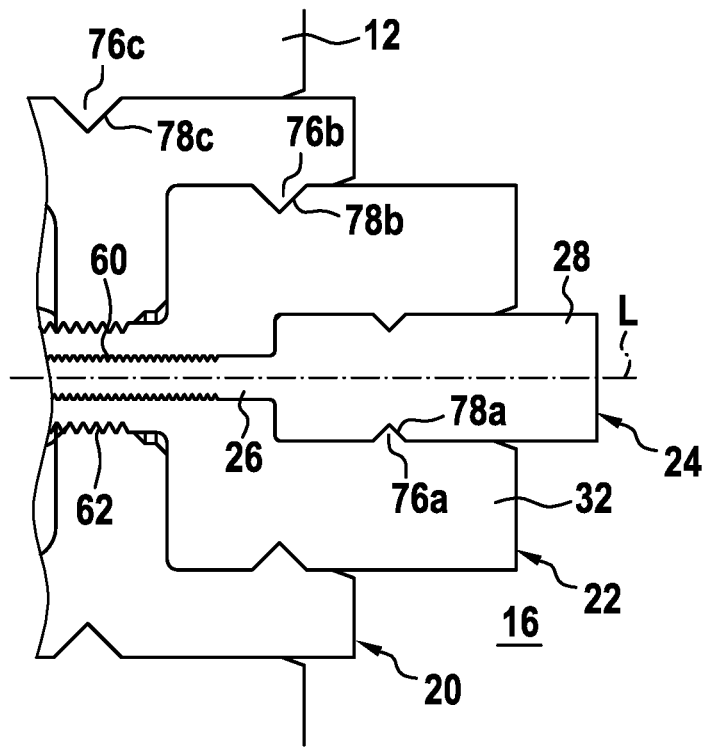
FIG. 4 a schematic sectional view of a liquid-tight sealing of two parts of a waveguide-coupling device according to a third exemplary embodiment.

The waveguide-coupling device 14 shown in FIG. 4 is also formed similarly to the waveguide-coupling device 14 in FIGS. 1, 2. However, the liquid-tight sealing of two adjacent parts 12, 20 or 20, 22 or 22, 24 or 20, 64 is formed such that the material of one of the components 12, 20, 22, 24, 64 forms a protrusion 76a-76c, for example in the form of a jagged projection, and is positively received in a receptacle 78a-78c formed in the opposite direction to the protrusion 76a-76c. For the purpose of an overview, the above-mentioned liquid-tight sealing between the flange 64 and the outer conductor element 20 is not depicted.

Figure 5:
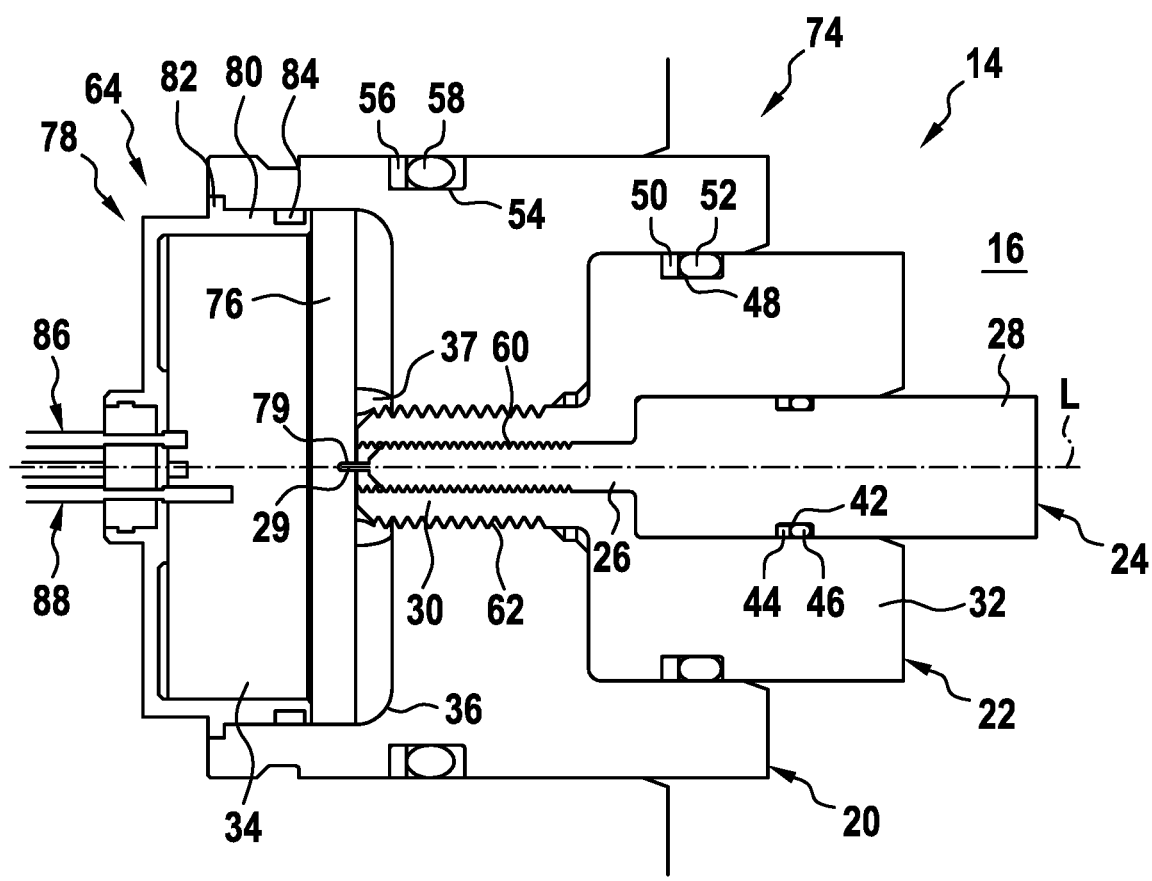
FIG. 5 a schematic three-dimensional depiction of a waveguide-coupling device according to a fourth exemplary embodiment.

The waveguide-coupling device 14 shown in FIG. 5 is formed similarly to the waveguide-coupling device 14 in FIGS. 1, 2. However, a second portion 28 of the inner conductor element 24 is formed to be axially longer, and a second portion 30 of the dielectric insulating element 22 is formed to be axially shorter. In comparison to FIGS. 1, 2, the inner conductor element 24 is arranged to be axially shifted further in the direction towards an inner chamber 16 in the installation state shown. A thread 60 has a smaller thread depth than a thread 62. Instead of the plate-shaped flange 64 having the integrated board, a two-part flange 64 is provided, which is formed by means of a base element 76 and a cup-shaped cover element 78. The base element 76 is provided in the recess 34 adjacently to a rounded contour 36 provided on the outer side and centrally with a blind hole in which a soldering tip 29 of the inner conductor element 24 is received. The cover element 78 serves for liquid-tight sealed sealing. A side surface 80 of the cover element 78 is introduced in the recess 34 in a precisely fitting manner and is suspended in a stepped, half open recess 66 of the outer conductor element 20. An end region of the side surface 80 pointing towards the inner chamber 16 is provided with a groove-shaped recess 84 which is fully peripheral, in which a liquid-tight seal against the outer conductor element 20, for example as depicted in FIG. 1 to FIG. 4, is achieved.

A circuit board (not shown) is integrated in the base element 76, which is connected to the inner conductor element 24 through the blind hole 79 by means of the soldering tip 29. The circuit board can also be arranged adjacently to the base element 76 on the side of the base element 76 pointing towards the inner conductor element 24 or on the side of the base element 76 facing towards the inner conductor element 24. In these cases, the base element 76 can be provided to be correspondingly thinner and without a blind hole or a through bore. It is also possible that the circuit board can further be arranged at a distance from the base element 76. In the cases in which the board is spaced further apart from the inner conductor element 24, the soldering tip 29 can be formed as a pin which is connected to the board by means of a high frequency plug. Several circuit boards can be provided instead of the plug.

Electrical connectors 86, 88 connect the boards to an electronic evaluation unit and are guided into a base surface of the cover element 78 via corresponding bores. The connectors 86, 88 are not a high-frequency line, but rather usual cable connections. The circuit board has a connector for supplying the microwave signal to the outer conductor element 24 and a connector for receiving an electrical signal from the inner conductor element 24 via the soldering tip 29.

Operation of the waveguide-coupling device 14 shown in FIG. 5 is similar to operation of the waveguide-coupling device in FIGS. 1, 2.

The position sensor devices 74 shown in FIG. 1, 2 or 5 achieve two different designs which are respectively suitable for a different cylinder diameter of the hydraulic cylinder 10. These designs can be similar for further exemplary embodiments of the position sensor device 74. The designs can be slightly geometrically changed or their dimensions can be correspondingly scaled in order to meet the individual adjustments to the hydraulic cylinder 10. It is possible that the electronic system for the position sensor device 10 is not integrated in the waveguide-coupling device 14, but rather is integrated, for example, outside this device in the evaluation unit 73. In this case, the inner conductor element 24 can be connected to a coaxial signal bus via the soldering tip 29 acting as a pin.

The invention claimed is:
1. Waveguide-coupling device for a hydraulic cylinder, having:
   a metallic outer conductor element,
   a metallic inner conductor element for supplying a microwave signal and for coupling a waveguide mode into a liquid-filled inner chamber of the hydraulic cylinder, and a dielectric insulating element arranged between the inner conductor element and the outer conductor element, wherein the inner conductor element and the dielectric insulating element as well as the dielectric insulating element and the outer conductor element are each connected to each other in a liquid-tight manner;

wherein the inner conductor element and the dielectric insulating element are connected to each other at least partially by means of a thread and wherein the dielectric insulating element and the outer conductor element are connected to each other at least partially by means of a thread, wherein the thread between the inner conductor element and the dielectric insulating element has a smaller thread depth than the thread between the dielectric insulating element and the outer conductor element.

2. Waveguide-coupling device according to claim 1, wherein the inner conductor element is formed substantially as a solid cylinder widening in a stepped manner, the dielectric insulating element is formed substantially as a hollow cylinder widening in a stepped manner and the outer conductor element is formed substantially as a hollow cylinder.

3. Waveguide-coupling device according to claim 1, wherein, for liquid-tight connection, an element of the inner conductor element and the dielectric insulating element has an at least partially peripheral recess and an adjacently arranged further element of the inner conductor element and the dielectric insulating element has an at least partially peripheral protrusion, which positively engage each other and/or wherein an element of the dielectric insulating element and the outer conductor element has an at least partially peripheral recess and an adjacently arranged further element of the dielectric insulating element and the outer conductor element has an at least partially peripheral protrusion, which positively engage each other for liquid-tight connection.

4. Waveguide-coupling device according to claim 1, wherein, for liquid-tight connection, an element of the inner guide element and the dielectric element has an at least partially peripheral recess in which an at least partially peripheral sealing element is received and an adjacently arranged further element of the inner conductor element and the dielectric insulating element bears flush against the element, and/or wherein, for liquid-tight connection, an element of the dielectric insulating element and the outer conductor element has an at least partially peripheral recess for liquid-tight connection, an at least partially peripheral sealing element being received in said recess, and an adjacently arranged further element of the dielectric insulating element and the outer conductor element bears flush against the element.

5. Waveguide-coupling device according to claim 4, wherein the sealing element is formed as a two-component injection-moulded part.

6. Waveguide-coupling device according to claim 4, wherein an at least partially peripheral support element is further received in the recess, said support element being arranged adjacently to the sealing element.

7. Waveguide-coupling device according to claim 6, wherein the sealing element is formed as an O-ring and/or the support element is formed as a support ring.

8. Hydraulic cylinder having a waveguide-coupling device according to claim 1.

9. Position sensor device for a hydraulic cylinder which has a waveguide-coupling device according to claim 1 and an electronic evaluation unit for determining a position of a piston of the hydraulic cylinder using a time difference and/or phase difference of a waveguide mode coupled by an inner conductor element into a liquid-filled inner chamber of the hydraulic cylinder and a waveguide mode reflected on the piston and detected by the inner conductor element.

10. Method for operating a waveguide-coupling device according to claim 1, wherein a microwave signal is supplied to an outer conductor element of the waveguide-coupling device which is converted by means of the waveguide-coupling device into a waveguide mode and is coupled into a liquid-filled inner chamber of the hydraulic cylinder in which the waveguide-coupling device is received.

* * * * *